Figure 1:
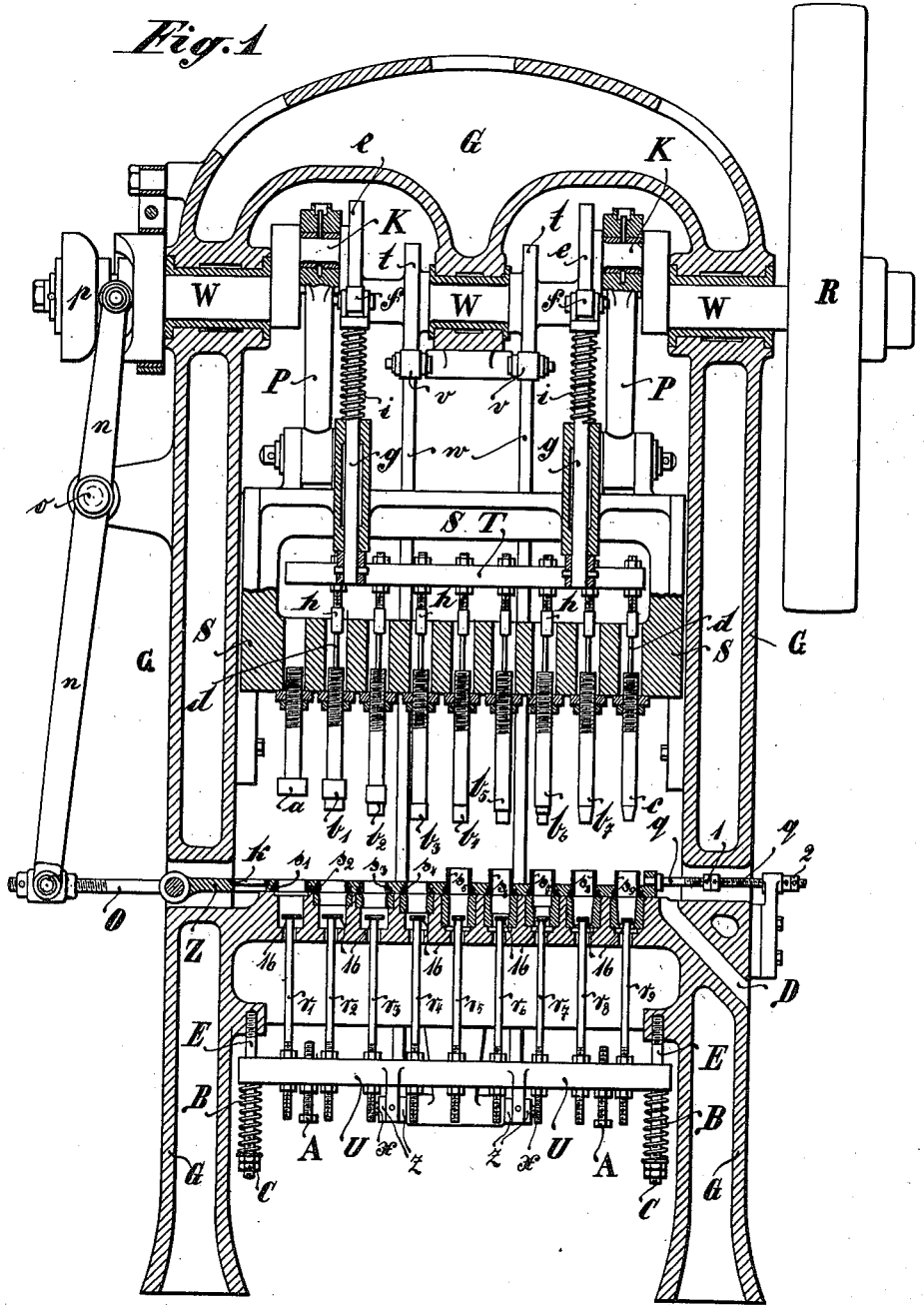

No. 726,800. PATENTED APR. 28, 1903.
W. LANGBEIN.
MACHINE FOR THE MANUFACTURE OF BOTTLE CAPSULES.
APPLICATION FILED APR. 1, 1902.
NO MODEL.
6 SHEETS—SHEET 1.

WITNESSES.
Albert Jones
Samuel Percival

INVENTOR
Wilhelm Langbein
By his Attorneys.
Wheatley & MacKenzie

No. 726,800. PATENTED APR. 28, 1903.
W. LANGBEIN.
MACHINE FOR THE MANUFACTURE OF BOTTLE CAPSULES.
APPLICATION FILED APR. 1, 1902.
NO MODEL. 6 SHEETS—SHEET 2.

WITNESSES
Albert Jones
Samuel Percival

INVENTOR
Wilhelm Langbein
By his Attorneys
Wheatley & MacKenzie

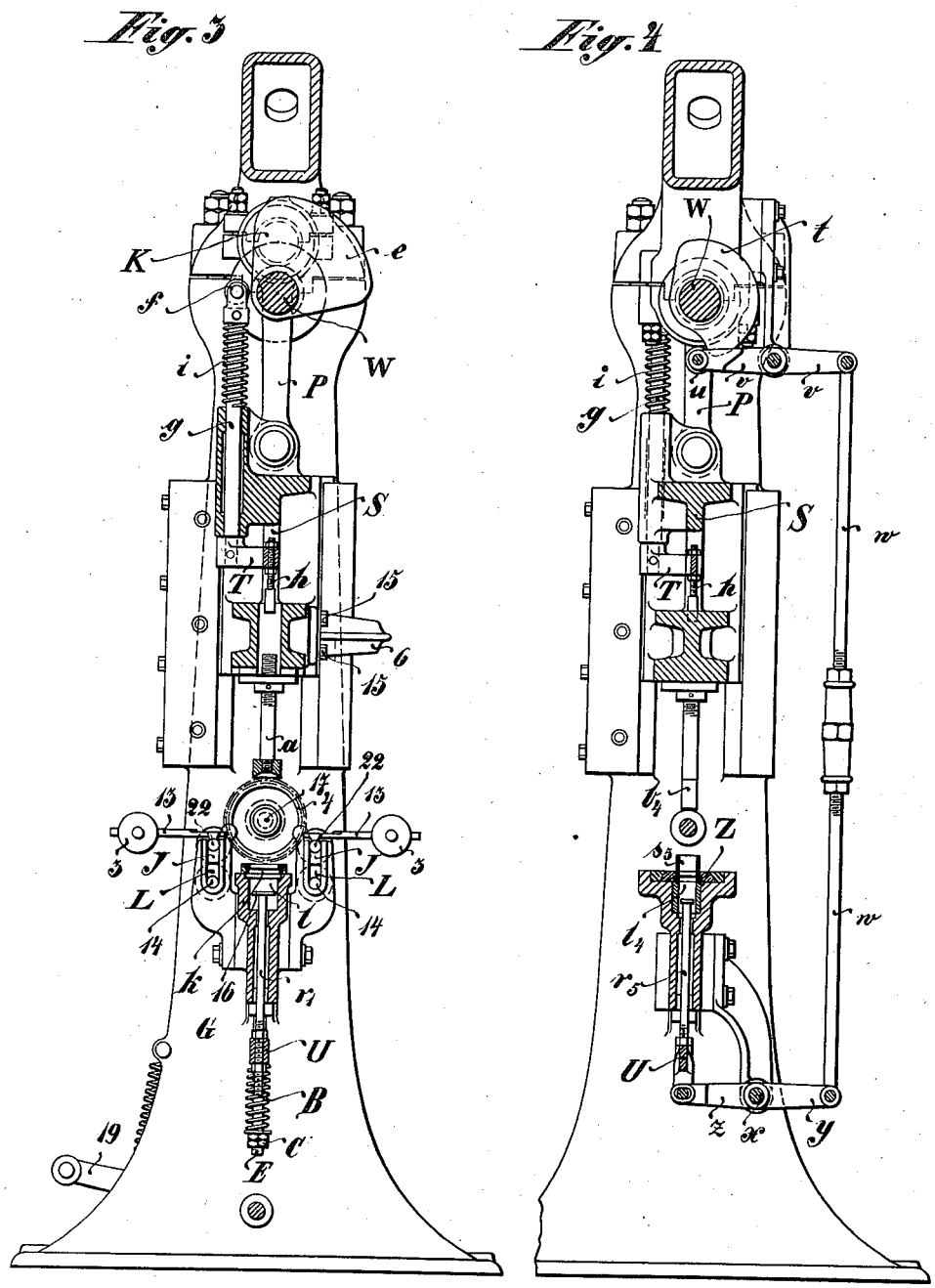

No. 726,800. PATENTED APR. 28, 1903.
W. LANGBEIN.
MACHINE FOR THE MANUFACTURE OF BOTTLE CAPSULES.
APPLICATION FILED APR. 1, 1902.
NO MODEL. 6 SHEETS—SHEET 4.
Fig. 6
Fig. 5
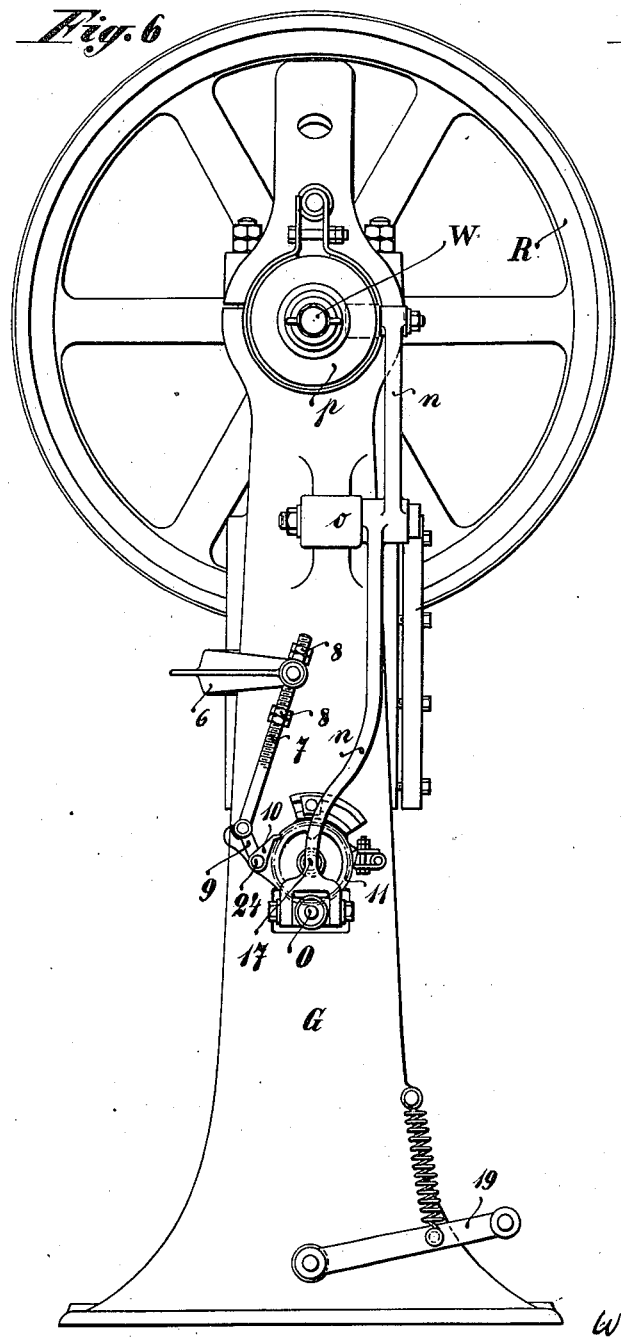
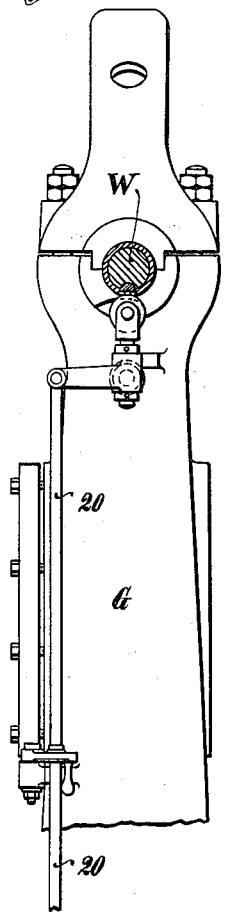
WITNESSES.
Albert Jones.
Samuel Percival.
INVENTOR
Wilhelm Langbein
By his Attorneys
Wheatly & MacKenzie No. 726,800. PATENTED APR. 28, 1903.
W. LANGBEIN.
MACHINE FOR THE MANUFACTURE OF BOTTLE CAPSULES.
APPLICATION FILED APR. 1, 1902.
NO MODEL. 6 SHEETS—SHEET 5.
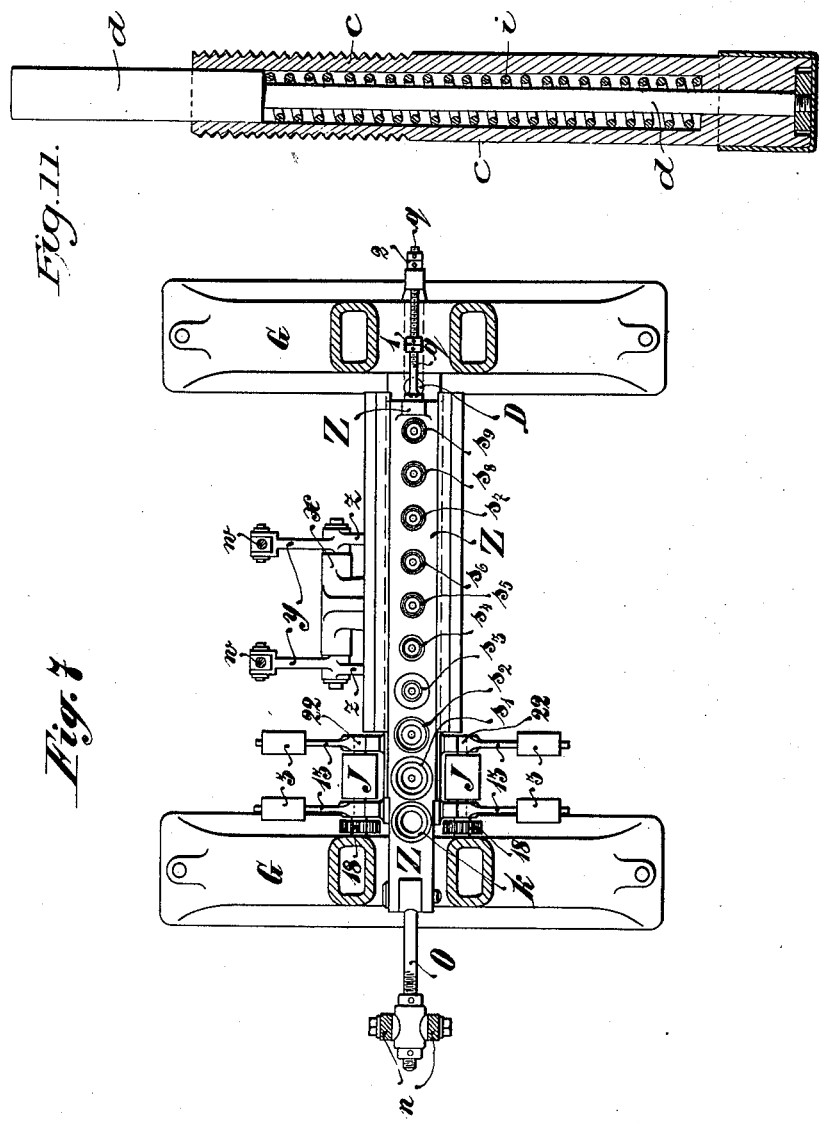
WITNESSES
Albert Jones
Samuel Percival
INVENTOR
Wilhelm Langbein
By his Attorneys
Wheatley & MacKenzie No. 726,800. PATENTED APR. 28, 1903.
W. LANGBEIN.
MACHINE FOR THE MANUFACTURE OF BOTTLE CAPSULES.
APPLICATION FILED APR. 1, 1902.
NO MODEL. 6 SHEETS—SHEET 6.
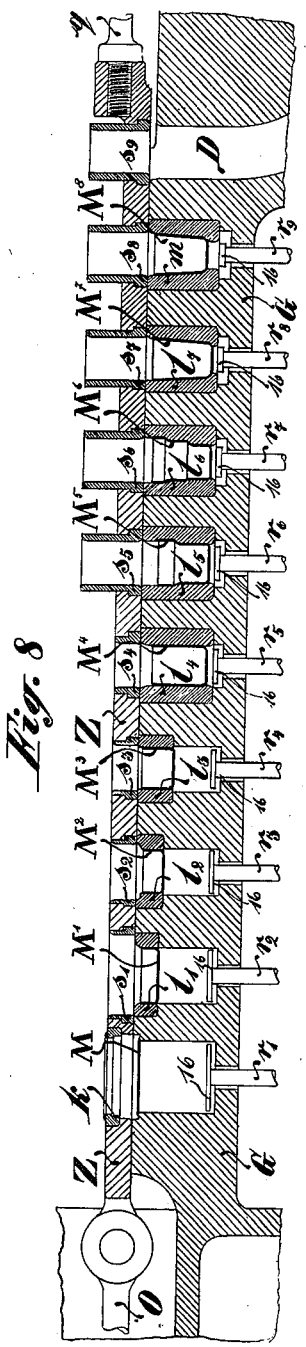
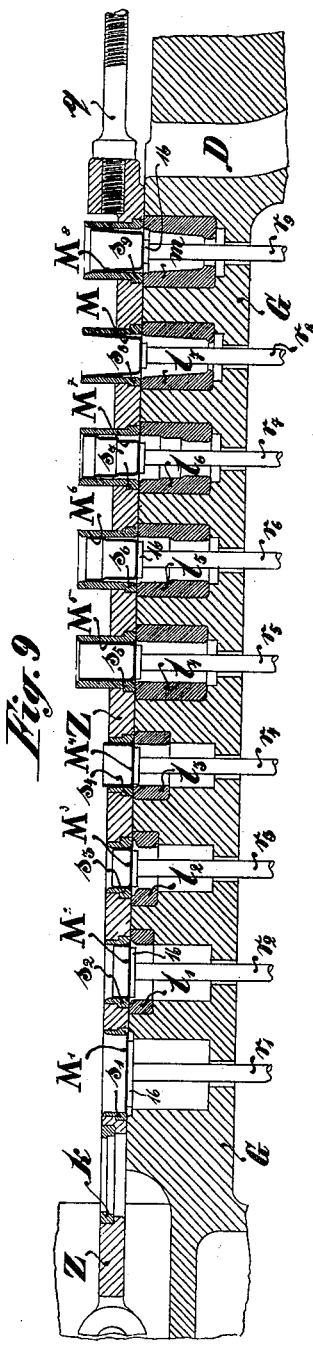
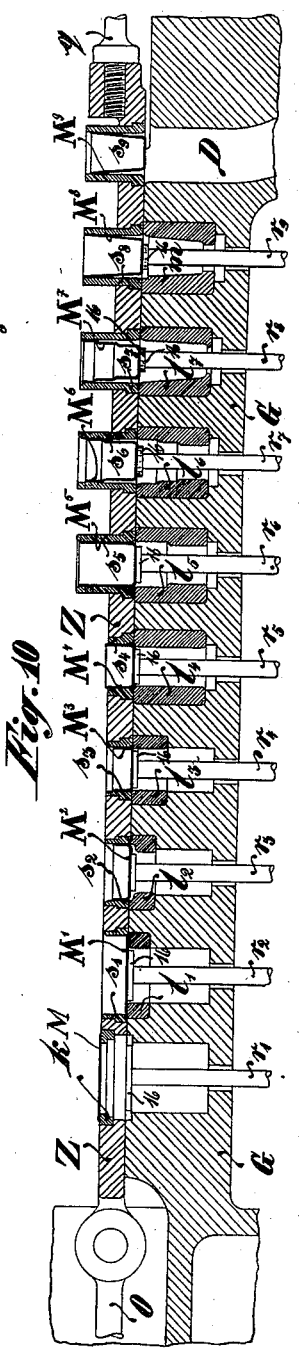
WITNESSES
Albert Jones
Samuel Percival
INVENTOR
Wilhelm Langbein
By his Attorneys
Wheatley MacKenzie

UNITED STATES PATENT OFFICE.

WILHELM LANGBEIN, OF DÖTTENDORF, NEAR BONN, GERMANY.

MACHINE FOR THE MANUFACTURE OF BOTTLE-CAPSULES.

SPECIFICATION forming part of Letters Patent No. 726,800, dated April 28, 1903.

Application filed April 1, 1902. Serial No. 100,972. (No model.)

*To all whom it may concern:*

Be it known that I, WILHELM LANGBEIN, a subject of the Emperor of Germany, residing at Döttendorf, near Bonn, in the Empire of Germany, have invented certain new and useful Improvements in Machines for the Manufacture of Bottle-Capsules; and I do hereby declare the following to be a full, clear, and exact description of the invention, such as will enable others skilled in the art to which it appertains to make and use the same.

This invention relates to a machine for the simultaneous stamping out of several bottle-capsules. The operation referred to is substantially carried out by the arrangement above the matrices of a feed-carriage with reciprocating lateral motion and provided with circumferentially-closed sockets for receiving the material, into which sockets the material is pushed by means of ejectors moving vertically in the table after the feed-carriage has returned to its original position. When this has taken place, the feed-carriage moves forward again, and each piece of material is brought under the next stamp until it has been cut to the proper length and is thrown out as a finished capsule. For the proper working of such a machine it is absolutely necessary to provide a means for removing the capsules from the stamps and preventing them from reaching the sockets of the feed-carriage before the backward motion of the latter is completed. Any desired number of matrices and stamps may be arranged side by side.

Figure 2:
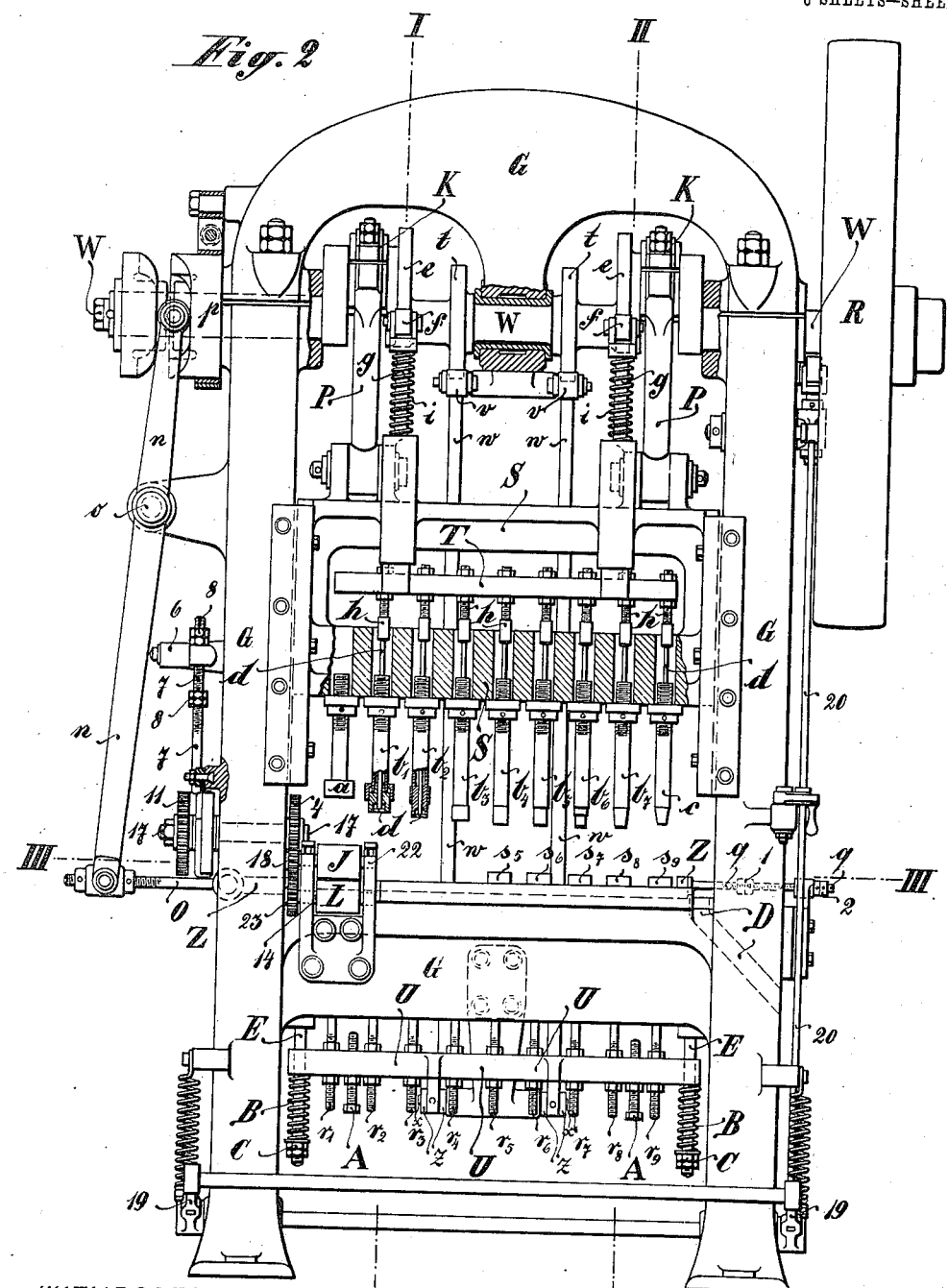

In Figure 1 of the accompanying drawings a machine of the kind is illustrated, partly in section, partly in elevation, with all the tools. Fig. 2 is an elevation of the machine with all the parts employed for actuating the tools, but without the tools, (stamp, ejectors.) Fig. 3 is a section along the line I I in Fig. 2; Fig. 4, a section along the line II II in Fig. 2; Fig. 5, a side view, partly in section, of the upper part of Fig. 2 seen from the right, the fly-wheel being removed; Fig. 6, a side view of Fig. 2 seen from the left, and Fig. 7 a horizontal section along the line III III in Fig. 2. Figs. 8 to 10 represent, on an enlarged scale, the position of the tools in the carriage shortly before and after the stamping, the piece of work just stamped being still in the matrix. Fig. 9 shows the piece of work raised by the ejectors $r'$ to $r^9$ out of the matrices up to the sockets $s'$ to $s^9$ of the carriage Z; Fig. 10, the pieces of work $M'$ to $M^9$, lying shortly before the stamping on the matrices, but still within the sockets. Fig. 11 shows a detail sectional view of the cutting-off stamp.

The whole of the movements are effected by the crank-shaft W, which is set in rotation by the pulley R. The motion of the cranks K is transmitted by connecting-rods P to the plunger S, to which an up-and-down motion is thereby imparted, Figs. 1 and 2. On the plunger S the stamps, which are adjustable in all directions, are arranged in a rod side by side. The stamps are respectively the incising-stamp $a$, the drawing-stamps $b'$ to $b^7$, and the cutting-off stamp $c$. The stamps are drilled in order to allow of the passage of the ejectors $d\ d$. The ejectors $d\ d$ are constantly pressed upward by springs $i\ i$; but when the cranks are in their lowest position—that is to say, after the cutting or stamping is finished and during a certain period of the upward movement of the plunger—they are kept down by the eccentrics $e\ e$, the rollers $f f$, rods $g\ g$, and bolts $h\ h$, fixed to the connecting-piece T, until the upward movement of the plunger S has removed the material M from the stamp, whereupon the rods $g\ g$, with the connecting-piece T suspended thereto, and the bolts $h\ h$, inserted in the latter, are raised by the springs $i\ i$.

In the table of the frame G the incising-ring K, the drawing-rings $l'$ to $l^7$, Fig. 1 and Figs. 8 to 10, and the cutting-off ring $m$ are set. Above these rings is the feed-carriage Z, that is guided on the table-plate of the frame G and connected by a connecting-rod O with the lever $n$, that oscillates around the bolt $o$, Figs. 1, 2, and 4. By means of the cams $p\ p$ the lever $n$ is caused to oscillate, whereby the feed-carriage is moved to right and left. The detent-screw $q$, with jaw-nuts 1 2, screwed into the feed-carriage Z, serves to guide the feed-carriage in a carefully-circumscribed course in order that the feed-carriage may not be pushed too far forward or backward by the movement of the heavy parts of the machine.

In the feed-carriage Z, moving backward and forward over the drawing-rings $l'$ to $l^4$, the incising-ring as well as the sockets $s'$ to $s^9$ are arranged.

The ejectors $r'$ to $r^9$ can enter the incising and drawing rings from below, whereby the incised or drawn material $M'$ to $M^9$ is pushed upward into the sockets $s'$ to $s^9$, whereupon the piece of work M is brought by the feed-carriage Z under the next stamp to the right for the purpose of further manipulation. The action of the ejectors $r'$ to $r^9$, arranged in the connecting-piece U, Figs. 1 and 4, is effected by the eccentrics $t\,t$ on the crank-shaft W, Figs. 1, 2, 6. The motion of the eccentrics is transmitted by the rollers $u\,u$, the double levers $v\,v$, and the connecting-rods $w\,w$ to the levers $y\,y$, which are situated on the shaft $x$, and thereby from the levers $z\,z$ to the connection-piece U, which is connected with them, and thus lowered, Figs. 1, 2, 4. The upward motion of the ejectors $r'$ to $r^9$, and the raising of the material into the sockets $s'$ to $s^9$ resulting therefrom, is effected by the springs B B, which lie on nuts C of the pins E. The course of the connecting-piece U during the upward motion can be accurately regulated by the adjusting screw-bolts A A. Moreover, the ejectors $r'$ to $r^9$ can themselves be vertically adjusted.

The machine acts quite automatically and only requires a new strip of tin-foil or tin-plate from time to time. The strip of tin-plate or tin-foil is moved forward over the incising-ring K by a feed apparatus, which is actuated by the plunger S and consists of rollers J L, Figs. 2 and 3, 6, and 4. If in consequence of the downward movement of the plunger the requisite piece of metal has been cut out, it will remain either in the incising-ring K or will drop into the small plate 16, fixed to the ejector, accordingly as the stamp enters more or less deeply into the incising-ring, Figs. 1 and 8. During the incising or drawing, however, the feed-carriage is not in the position shown in the drawing, Fig. 1, but is pushed to the extent of one hole to the right, as shown on an enlarged scale in Fig. 8—that is to say, the feed-socket $s'$ is beneath the drawing-stamp $b'$ and above the drawing-ring $l'$, &c. In Fig. 8 the position is shown in which the stamp has finished the drawing; but the piece of work is, however, still in the matrices $l'$ to $l^7$. After the incising or drawing the feed-carriage moves back to the left into the position indicated in the drawing, Fig. 9, and remains there stationary until the ejectors $r'$ to $r^9$ have moved upward and have pushed the incised and drawn blanks $M'$ to $M^9$ upward into the feeding-sockets $s'$ to $s^9$, which position is shown on an enlarged scale in Fig. 9, whereupon the carriage moves again to the right, and thereby brings the material $M'$ to $M^9$ beneath the next stamp, Fig. 10. The carriage Z now remains stationary again until the stamps $b'$ to $b^7$ have done their work, whereupon the carriage Z, as already described, again moves to the left to take up fresh material $M'$ to $M^9$, so that with the continuous movement of the feed-carriage not only is a fresh sheet of metal M constantly taken up, but the material already in hand is continuously moved after each drawing operation more to the right and after being cut to the proper length by the cutting-off stamp $c$ drops during the next motion of the feed-carriage Z to the right through an opening D in the frame as a finished capsule. The reciprocating movement of the feed-carriage Z and the requisite pauses are regulated by suitably-shaped cam-disks.

The feeding of the strip of metal to be cut is effected by means of rollers J L, which are pressed against one another by weights on the levers 13 13, Figs. 2, 6, and 7. The impulsion is effected by the plunger S in the following manner: To the plunger S the arm 6 is suitably secured. This arm is connected by rods 7 and nuts 8 with the lever 9, Fig. 6. The lever 9 is likewise keyed, together with a pawl 10, to the bolt 24, Figs. 2 and 6, the pawl engaging in and engaging and disengaging wheel 11, so that at each forward movement of the plunger S the wheel 11 and therewith the tooth-wheel 4, keyed on the same shaft 17, is suitably farther rotated. A further tooth-wheel 18 is on the shaft 22 of the upper roller J, which works in conjunction with the toothed wheel 17 and the tooth-wheel 23, so that both rollers J and L are rotated in suitable degrees and the piece of metal is pushed under the incising-stamp $a$. The lever 19 and the rod 20 serve as a brake for the machine while the power is transmitted to the pulley or fly-wheel R, seated on the main shaft, Fig. 2.

It is clear that a machine of the kind works very much more economically than those hitherto known, as the pieces of work are not conveyed either by their own weight or by so-called "grippers," but by circumferentially-closed sockets, and consequently are not liable during and through the act of conveying to be exposed to considerable deformation, as is the case with the means of conveyance mentioned above and previously known and which accordingly involve greater loss of material. Moreover, the machine can be easily arranged for two or more rows of stamps, so that at each stroke of the crank two or more finished capsules can be produced.

What I claim, and desire to secure by Letters Patent, is—

A machine for stamping out and shaping bottle-capsules, consisting of a table, matrices in the table corresponding to the shape of the capsule in different stages of its manufacture, ejectors working in the matrices to push out the finished or partly-finished capsules, a reciprocating feed-carriage mounted on the table and provided with circumferentially-closed sockets for receiving the blanks from the matrices as they are ejected, and feeding the blanks or partly-finished capsules from one matrix to another at each reciprocation, stamps or male dies mounted above the matrices in a suitable holder reciprocating in vertical guides, and ejectors working in the dies, substantially as described.

In witness whereof I have hereunto set my hand in presence of two witnesses.

WILH. LANGBEIN.

Witnesses:
WALTER BECKER,
FRITZ HENNICKE.